United States Patent
Arendell et al.

(10) Patent No.: US 10,193,361 B2
(45) Date of Patent: Jan. 29, 2019

(54) BATTERY PROTECTION CIRCUIT AND METHOD

(71) Applicant: MOTOROLA SOLUTIONS, INC., Schaumburg, IL (US)

(72) Inventors: Scott J. Arendell, Buford, GA (US); Roger L. Boyer, Snellville, GA (US); John E. Herrmann, Suwanee, GA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 217 days.

(21) Appl. No.: 15/155,766

(22) Filed: May 16, 2016

(65) Prior Publication Data

US 2017/0331304 A1 Nov. 16, 2017

(51) Int. Cl.
*H02J 7/00* (2006.01)
(52) U.S. Cl.
CPC ............ *H02J 7/0029* (2013.01); *H02J 7/007* (2013.01); *H02J 2007/0037* (2013.01)
(58) Field of Classification Search
USPC ........................................................ 320/107
See application file for complete search history.

(56) References Cited

U.S. PATENT DOCUMENTS

| | | | |
|---|---|---|---|
| 3,529,210 A | 9/1970 | Ito et al. | |
| 4,146,847 A | 3/1979 | Otao et al. | |
| 4,296,278 A | 10/1981 | Cullison et al. | |
| 4,301,330 A | 11/1981 | Trump | |
| 4,427,951 A | 1/1984 | Amada et al. | |
| 5,224,169 A | 6/1993 | Morris, Jr. et al. | |
| 5,469,002 A | 11/1995 | Garrett | |
| 5,631,566 A | 5/1997 | Person et al. | |
| 5,847,610 A | 12/1998 | Fujita | |
| 5,973,569 A | 10/1999 | Nguyen | |
| 6,339,526 B1 | 1/2002 | Aboyoussef et al. | |
| 7,068,012 B1 | 6/2006 | Geren et al. | |

(Continued)

FOREIGN PATENT DOCUMENTS

| GB | 2534949 | 8/2016 |
|---|---|---|
| WO | 2013019118 | 2/2013 |

OTHER PUBLICATIONS

Texas Instrument, "ILM4951A (active)—Wide Voltage Range 1.8 Watt Audio Power Amplifier with Short Circuit Protection," technical document (1995-2016) 2 pages, http://www.ti.com/product/LM4951A.

(Continued)

*Primary Examiner* — Robert Grant
(74) *Attorney, Agent, or Firm* — Michael Best & Friedrich LLP

(57) ABSTRACT

A method and apparatus for a battery protection circuit. One embodiment provides a method for protecting a battery including receiving, with a comparator, a first voltage, the first voltage including a switch voltage across a current limiting switch provided on a current path of a battery and coupled to a current limiting control circuit to limit current output by the battery. The method also includes receiving, with the comparator, a reference voltage and comparing, with the comparator, the first voltage and the reference voltage. The method further includes controlling, with the comparator, a control switch to open when the first voltage exceeds the reference voltage.

20 Claims, 6 Drawing Sheets

(56) References Cited

U.S. PATENT DOCUMENTS

| | | |
|---|---|---|
| 8,575,898 B2* | 11/2013 | Kitano ............... H02J 7/0047 320/132 |
| 2005/0242885 A1 | 11/2005 | Craynon et al. |
| 2006/0052129 A1 | 3/2006 | Hong et al. |
| 2007/0080745 A1 | 4/2007 | French et al. |
| 2008/0101638 A1 | 5/2008 | Ziller |
| 2009/0143111 A1 | 6/2009 | Oglesbee et al. |
| 2010/0022209 A1 | 1/2010 | Ng et al. |
| 2011/0182434 A1 | 7/2011 | Martz et al. |
| 2012/0033820 A1 | 2/2012 | Wang |
| 2012/0225331 A1 | 9/2012 | Tartaglia |
| 2013/0077796 A1 | 3/2013 | Risbo et al. |
| 2013/0181683 A1* | 7/2013 | Wang ................. H03K 3/011 320/150 |
| 2014/0086418 A1 | 3/2014 | Lubberhuizen et al. |
| 2015/0086026 A1 | 3/2015 | Tan et al. |
| 2015/0263684 A1 | 9/2015 | Tu et al. |
| 2018/0152785 A1 | 5/2018 | Yeoh et al. |

OTHER PUBLICATIONS

Sibson, "Over-current protection in audio amplifiers," technical document (Aug. 6, 2008) 3 pages, http://www.eetimesti.com/document.asp?doc_id=1274919.

PCT/US2017/059020 International Search Report and Written Opinion of the International Searching Authority dated Jan. 5, 2018 (16 pages).

Office Action from the US Patent and Trademark Office for U.S. Appl. No. 15/362,070 dated Oct. 6, 2017 (24 pages).

Office Action from the US Patent and Trademark Office for U.S. Appl. No. 15/362,070 dated May 18, 2018 (19 pages).

* cited by examiner

BATTERY PROTECTION CIRCUIT AND METHOD

BACKGROUND OF THE INVENTION

Various electronic devices may include internal circuits having metal oxide semi-conductor field effect transistors (MOSFETs) or other switches. These switches may temporarily or permanently become non-functional for various reasons. In these non-functional states, current flow through the switches may generate heat, which may affect other internal components or may radiate to an external surface of the electronic device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
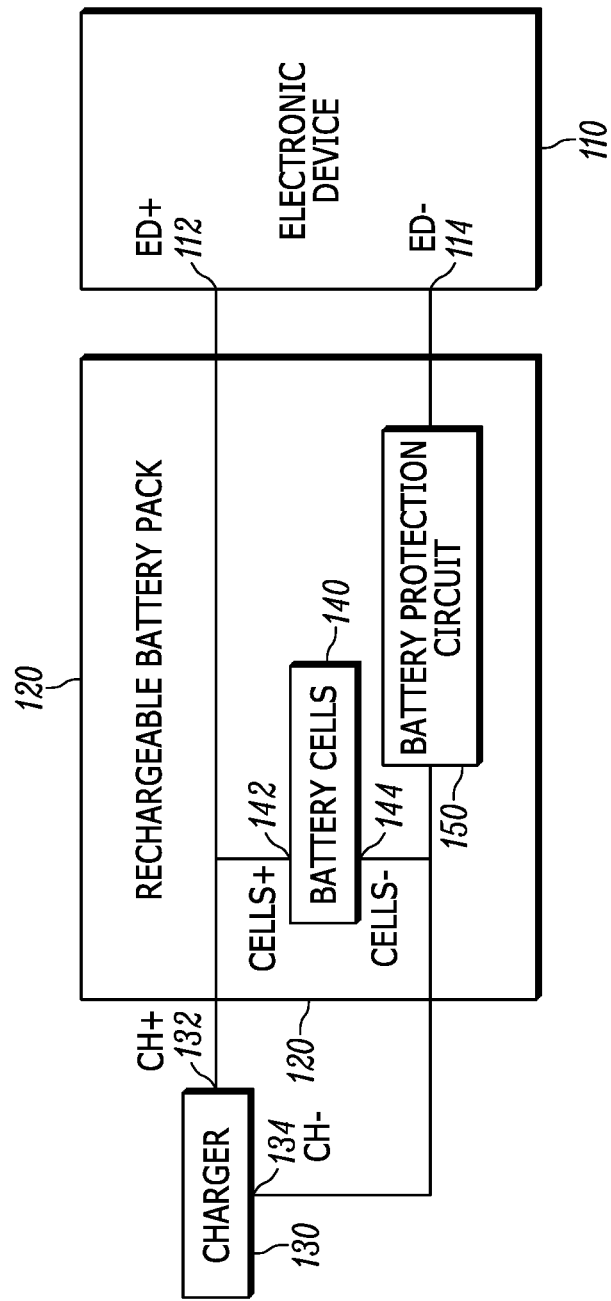
FIG. 1 is a block diagram of an electronic device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

When a switch in an electronic device fails, the internal resistance of the switch may increase. A current flowing through this high-resistance switch may increase the heat dissipated by the switch thereby raising the temperature of the device in which the switch is located. The voltage across the switch may also increase due to the increase in the internal resistance of the switch, for example, assuming current does not significantly decrease. Removing the switch from circuit, that is, opening the switch will remove the current flowing through higher internal resistance and therefore reduce the heat generated by the switch.

One embodiment provides a battery protection circuit including a current limiting switch provided on a current path of a battery and coupled to a current limiting control circuit to limit current output by the battery. The current limiting switch includes a switch voltage contributing to a first voltage. The battery protection circuit also includes a control switch and a comparator. The comparator includes a reference voltage input to receive a reference voltage and a voltage input to receive the first voltage. The comparator also includes a control output coupled to the control switch. The comparator is configured to provide a control signal that opens the control switch when the first voltage exceeds the reference voltage.

Another embodiment provides a method for protecting a battery including receiving, with a comparator, a first voltage, the first voltage including a switch voltage across a current limiting switch provided on a current path of a battery and coupled to a current limiting control circuit to limit current output by the battery. The method also includes receiving, with the comparator, a reference voltage and comparing, with the comparator, the first voltage and the reference voltage. The method further includes controlling, with the comparator, a control switch to open when the first voltage exceeds the reference voltage.

FIG. 1 is a block diagram of one embodiment of an electronic device 110. The electronic device 110 may be, for example, a two-way radio, a smart telephone, a tablet computer, a personal computer, and the like that is powered by a rechargeable battery pack 120. The rechargeable battery pack 120 may be charged with an external charger 130. In some embodiments, the rechargeable battery pack 120 is included in the electronic device 110. In other embodiments, the rechargeable battery pack 120 is removably coupled to the electronic device 110. The charger 130 may be connected to the electronic device 110 to charge the rechargeable battery pack 120 and to provide power to the electronic device 110. The rechargeable battery pack 120 includes battery cells 140 and a battery protection circuit 150. In some embodiments, the battery protection circuit 150 is included in the electronic device 110 rather than in the rechargeable battery pack 120.

The battery cells 140 include positive terminal 142 connected to a positive terminal 112 of the electronic device 110. The battery cells 140 include a negative terminal 144 connected to a negative terminal 114 of the electronic device 110 through the battery protection circuit 150. When the charger 130 is connected, a positive terminal 132 of the charger 130 is connected to the positive terminal 112 and the positive terminal 142 and a negative terminal 134 of the charger 130 is connected to the negative terminal 114 and the negative terminal 144.

Figure 2:
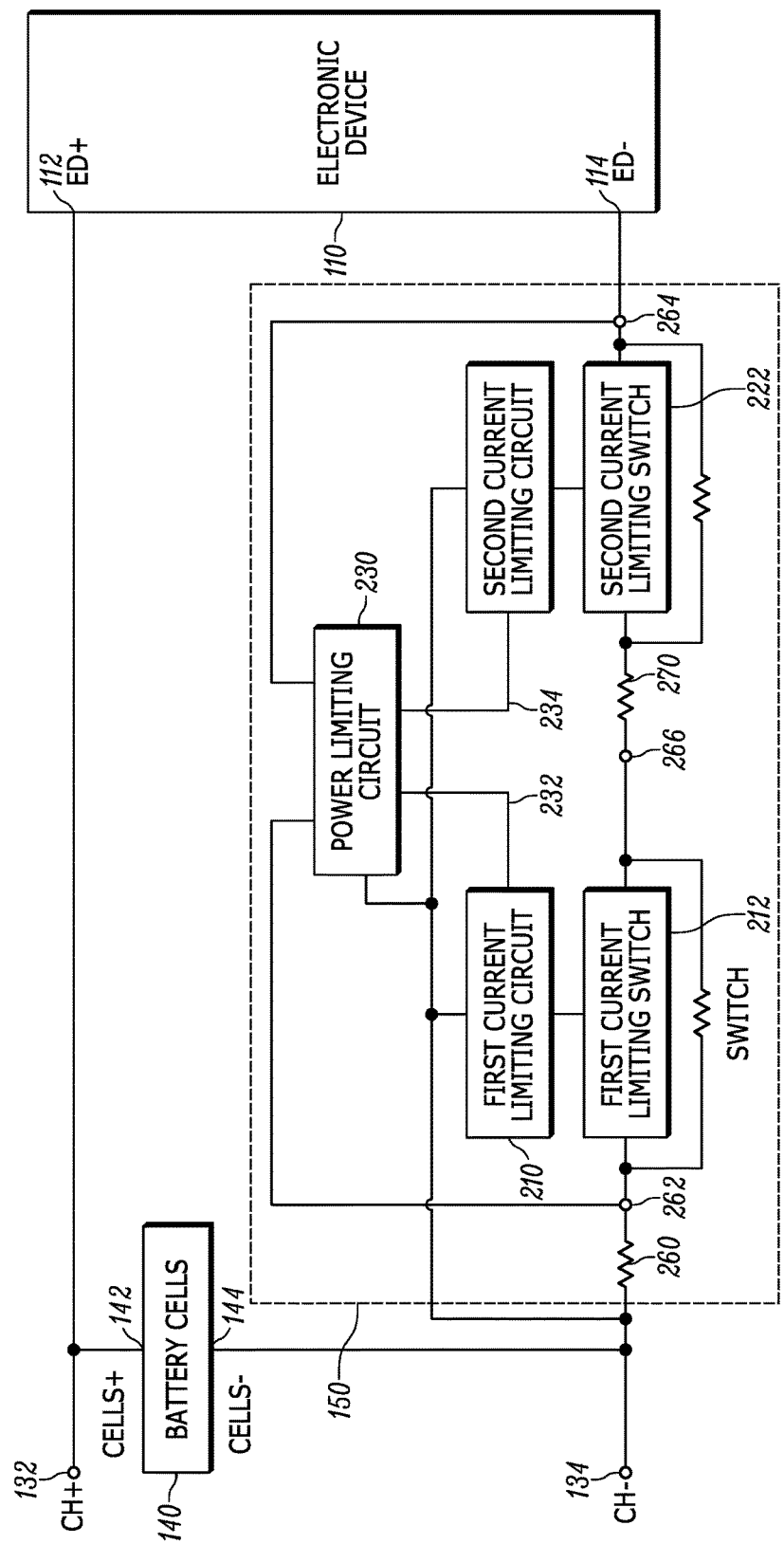
FIG. 2 is a block diagram of a battery protection circuit of the electronic device of FIG. 1 in accordance with some embodiments.

FIG. 2 is a block diagram of one embodiment of the battery protection circuit 150. The battery protection circuit 150 prevents excess current flowing through the battery pack 120 and the electronic device 110. The battery protection circuit 150 also prevents the component of the battery pack 120 and the electronic device 110 from generating excess heat. In the example illustrated, the battery protection circuit 150 includes a first current limiting control circuit 210, a second current limiting control circuit 220, and a power limiting circuit 230. FIG. 1 illustrates only one exemplary embodiment of a battery protection circuit 150. The battery protection circuit 150 may include more or fewer components than illustrated and may perform additional functions other than those described herein.

The first current limiting control circuit 210 is connected to the negative terminal 144 of the battery cells 140. The first current limiting control circuit 210 monitors a current flow between the battery cells 140 and the electronic device 110. More specifically, the first current limiting control circuit 210 monitors a current across a first sense resistor 260. The first current limiting control circuit 210 provides a control output to a first current limiting switch 212. When the first current limiting control circuit 210 determines that the current flowing between the battery cells 140 and the electronic device 110 or between the charger 130 and the electronic device 110 exceeds a threshold, the first current limiting control circuit 210 opens the first current limiting switch 212 to limit the current flow.

The second current limiting control circuit 220 is connected in series with the first current limiting control circuit 210 to the negative terminal 144 of the battery cells 140. The second current limiting control circuit 220 monitors a current flow between the battery cells 140 and the electronic device 110. More specifically, the second current limiting control circuit 220 monitors a current across a second sense resistor 270. An output of the second current limiting control circuit 220 is provided to a second current limiting switch 222. The second current limiting switch 222 is connected in series with the first current limiting switch 212, a first sense resistor 260, and a second sense resistor 270 (that is, a resistive element). The second current limiting control circuit 220 operates similar to the first current limiting control circuit 210 to control the second current limiting switch 222.

The power limiting circuit 230 is connected between the negative terminal 144 of the battery cells 140 and the negative terminal of the electronic device 110. The power limiting circuit 230 monitors a voltage between the nodes 262 and 264 (that is, the power limiting circuit 230 measures a first voltage). As described in more detail below, the power limiting circuit 230 includes a reference voltage input to receive a reference voltage. The power limiting circuit 230 provides a first control input 232 to the first current limiting switch 212 and a second control input 234 to the second current limiting switch 222. When the power limiting circuit 230 determines that the voltage between the nodes 262 and 264 exceeds the reference voltage, the power limiting circuit 230 opens the first current limiting switch 212 and the second current limiting switch 222.

In some embodiments, the battery protection circuit 150 may be connected between the positive terminal 142 of the battery cells 140 and the positive terminal 112 of the electronic device 110 instead of between the negative terminal 144 of the battery cells 140 and the negative terminal 114 of the electronic device 110. That is, the first current limiting control circuit 210, the second current limiting control circuit 220, and/or the power limiting circuit 230 are connected between the positive terminal 142 of the battery cells 140 and a positive terminal 112 of the electronic device 110.

Figure 3:
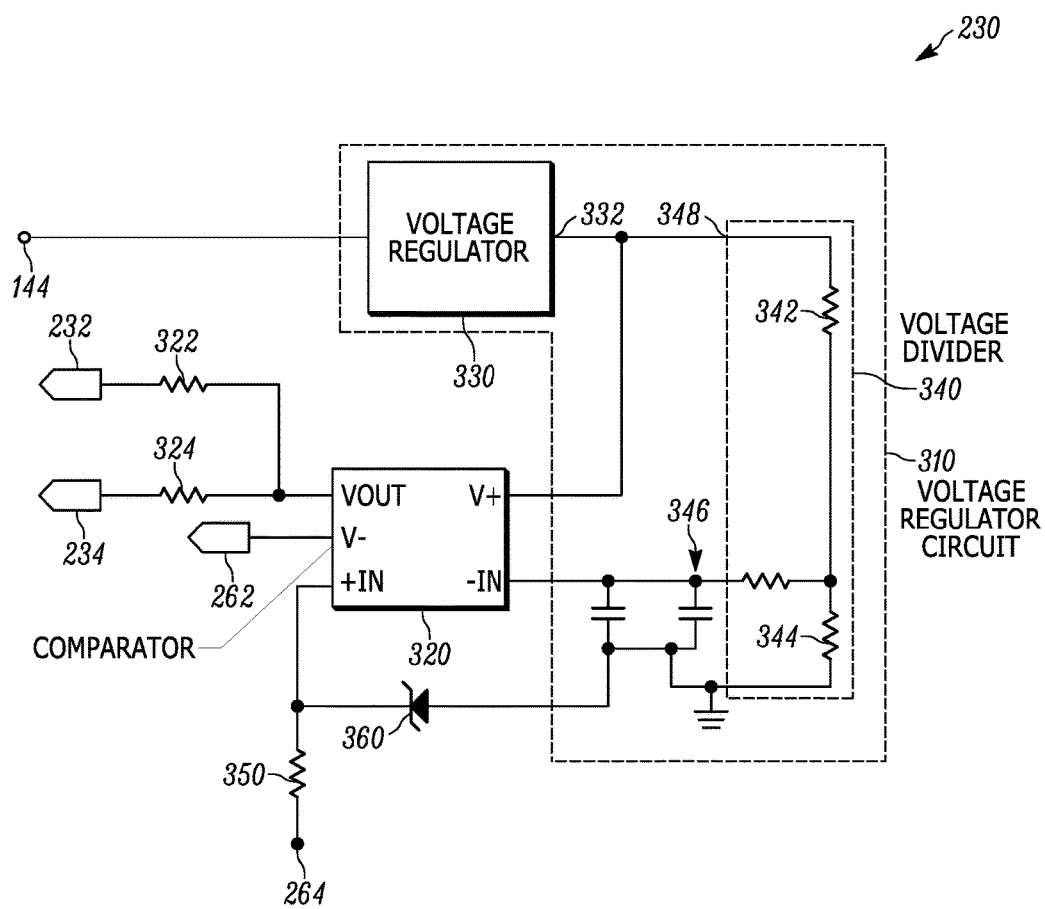
FIG. 3 is a schematic of a power limiting circuit of the battery protection circuit of FIG. 2 in accordance with some embodiments.

FIG. 3 is a schematic of one embodiment of the power limiting circuit 230. In the example illustrated, the power limiting circuit 230 includes a voltage regulator circuit 310 and a comparator 320 (for example, power limiting circuit comparator). The voltage regulator circuit 310 includes a voltage regulator 330 and a voltage divider circuit 340. The voltage regulator 330 is connected to the negative terminal 144 of the battery cells 140 and receives current from the battery cells 140. The output 332 (for example, an operating voltage output) of the voltage regulator 330 is provided to the comparator 320 and to the voltage divider circuit 340. The voltage divider circuit 340 includes a voltage divider input 348 to receive operating voltage from the voltage regulator 330. The voltage divider circuit 340 also includes two resistors 342 and 344 connected in series between the output of the voltage regulator 330 and ground. A reference voltage is provided to the comparator 320 after a drop across the resistor 342 (that is, at a voltage divider output). In some embodiments, the reference voltage is provided to the comparator 320 after passing through the filtering circuit 346. The power limiting circuit 230 may include more or fewer components than illustrated and may perform additional functions other than those described herein.

In the example illustrated, the positive supply V+ of the comparator 320 is connected to the output of the voltage regulator 330. The negative supply V− is connected to the node 262 (as shown in FIG. 2). In some embodiments, the negative supply V− may be connected to ground. The inverting input IN− receives the reference voltage and is connected to the output of the voltage regulator circuit 310, more specifically to the output of the voltage divider circuit 340. The non-inverting input IN+ is connected to the node 264 through the input resistor 350 (see FIG. 2). A zener diode 360 is connected between non-inverting input IN+ and ground. The output of the comparator 320 is provided to control the first current limiting switch 212 and the second current limiting switch 222 through resistors 322 and 324 respectively. The comparator 320 may be implemented, for example, with a Texas Instruments LMV7239 comparator.

Figure 4:
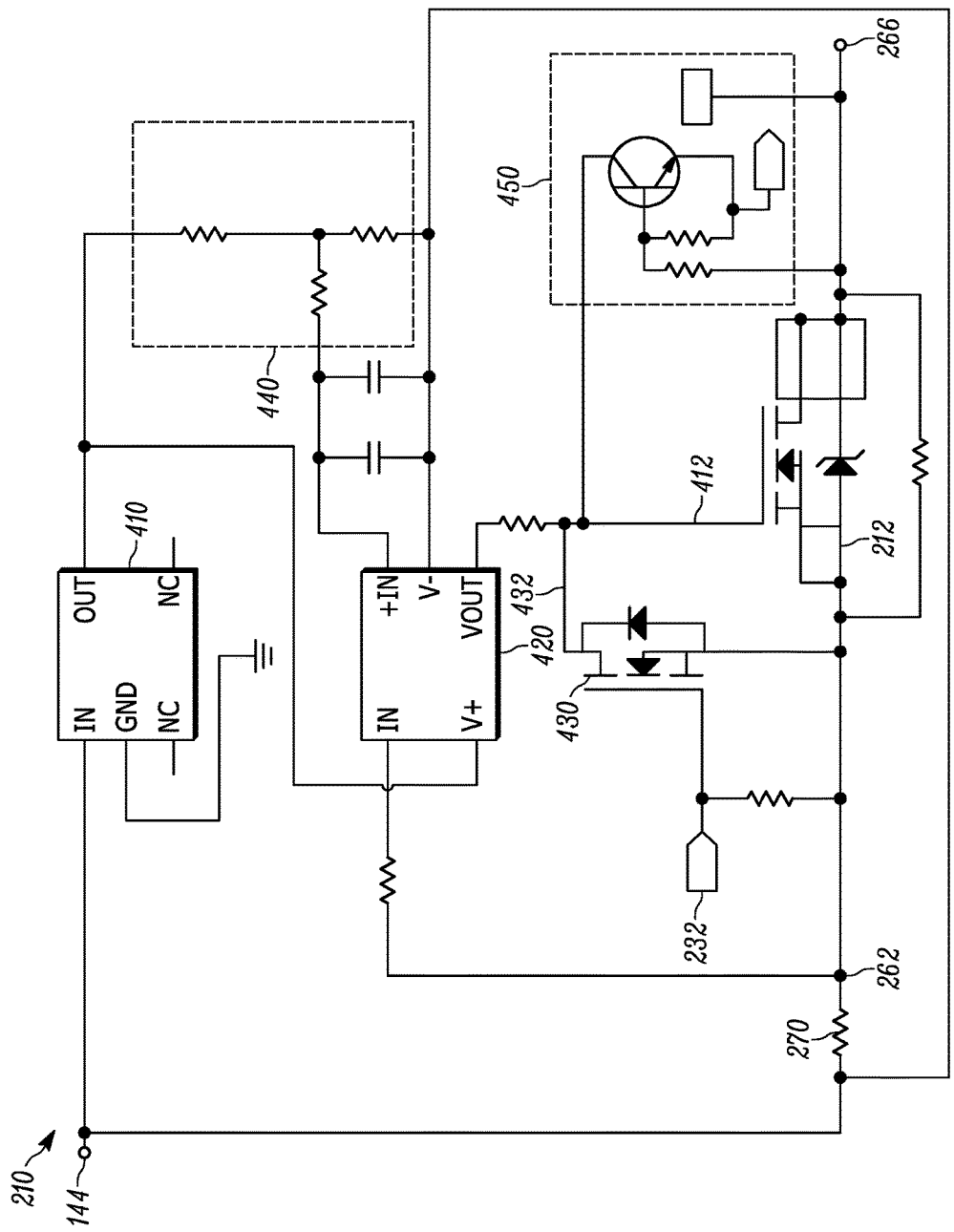
FIG. 4 is a schematic of a current limiting circuit of the battery protection circuit of FIG. 2 in accordance with some embodiments.

FIG. 4 is a schematic of one embodiment of the first current limiting control circuit 210. In the example illustrated, the first current limiting control circuit 210 includes a first voltage reference chip 410 and a first current comparator 420. The first voltage reference chip 410 is connected to the negative terminal 144 of the battery cells 140 and receives current from the battery cells 140 (see FIG. 2). The first current comparator 420 receives operating power from the first voltage reference chip 410 at the positive supply V+. The first current comparator 420 also receives a reference current from the first voltage reference chip 410 at the non-inverting input IN+ through a first current divider circuit 440. The first current comparator 420 receives the current flowing to the electronic device 110 at the inverting input IN− (see FIG. 2). The output VOUT of the first current comparator 420 controls the first current limiting switch 212. For example, the output VOUT controls the first current limiting switch 212 to open in the event of an overcurrent condition as determined based on the comparison of the first current comparator 420. In some embodiments, the first current limiting control circuit 210 includes a first latching circuit 450. The first latching circuit 450 prevents the first current comparator 420 from closing the first current limiting switch 212 before the over-current condition is removed. The first current limiting control circuit 210 may include more or fewer components than illustrated and may perform additional functions other than those described herein.

The first current limiting switch 212 may be implemented, for example, with a metal oxide semi-conductor field effect transistor (MOSFET). The input of the first current limiting switch 212 is connected to the negative terminal of the battery cells 140. The output of the first current limiting switch 212 is provided to the electronic device 110 through the node 266 and the second current limiting switch 222. In other words, the first current limiting switch 212 is provided on a current path between the battery cells 140 and the electronic device 110. A first control input 412 of the first current limiting switch 212 is connected to the output of the first current comparator 420. The first control input 412 is also connected to the output of the power limiting circuit 230 through a first driving switch 430.

The first driving switch 430 may be implemented, for example, with a metal oxide semi-conductor field effect transistor (MOSFET). The first driving switch 430 includes a first driver control input coupled to the output 232 of the comparator 320 through the resistor 322. The first driving output 432 of the first driving switch 430 is coupled to the first control input 412 of the first current limiting switch 212.

Figure 5:
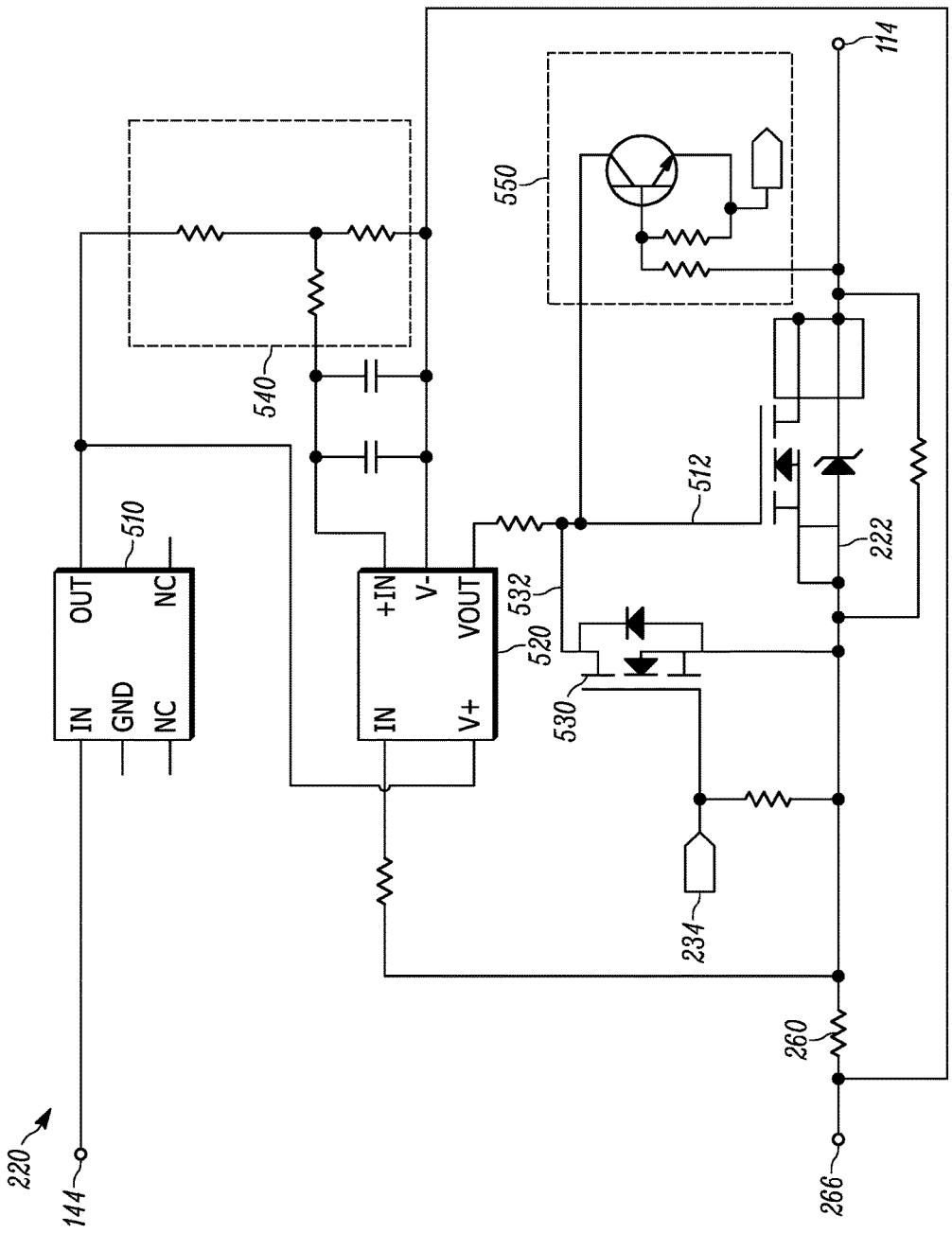
FIG. 5 is a schematic of a current limiting circuit of the battery protection circuit of FIG. 2 in accordance with some embodiments.

FIG. 5 is a schematic of one embodiment of the second current limiting control circuit 220. In the example illustrated, the second current limiting control circuit 220 includes a second voltage reference chip 510 and a second current comparator 520. The second voltage reference chip 510 is connected to the negative terminal 144 of the battery cells 140 and receives current from the battery cells 140. The second current comparator 520 receives operating power from the second voltage reference chip 510 at the positive supply V+. The second current comparator 520 also receives a reference current from the second voltage reference chip 510 at the non-inverting input IN+ through a second current divider circuit 540. The second current comparator 520 receives the current flowing to the electronic device 110 at the inverting input IN−. The output VOUT of the second current comparator 520 controls the second current limiting switch 222. For example, the output VOUT controls the second current limiting switch 222 to open in the event of an overcurrent condition as determined based on the comparison of the second current comparator 520. In some embodiments, the second current limiting control circuit 220 includes a second latching circuit 550. The second latching circuit 550 prevents the second current comparator 520 from closing the second current limiting switch 222 before the over-current condition is removed. The second current limiting control circuit 220 may include more or fewer components than illustrated and may perform additional functions other than those described herein.

The second current limiting switch 222 may be implemented, for example, with a metal oxide semi-conductor field effect transistor (MOSFET). The input of the second current limiting switch 222 is connected to the negative terminal 144 of the battery cells 140 through the node 266 and the first current limiting switch 212. The output of the second current limiting switch 222 is provided to the electronic device 110. In other words, the second current limiting switch 222 is provided on a current path between the battery cells 140 and the electronic device 110. A second control input 512 of the second current limiting switch 222 is connected to the output of the second current comparator 520. The second control input 512 is also connected to the output of the power limiting circuit 230 through a second driving switch 530.

The second driving switch 530 may be implemented, for example, with a metal oxide semi-conductor field effect transistor (MOSFET). The second driving switch 530 includes a second driver control input coupled to the output 234 of the comparator 320 through the resistor 324. The second driving output 532 of the second driving switch 530 is coupled to the second control input 512 of the second current limiting switch 222.

Figure 6:
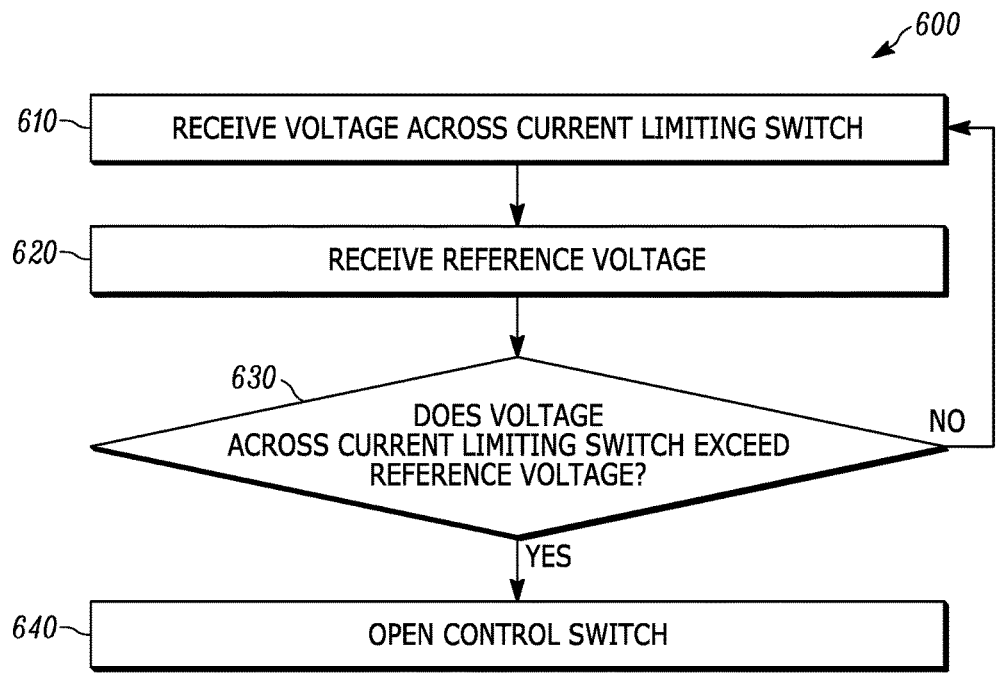
FIG. 6 is a flowchart of a method of protecting a battery in accordance with some embodiments.

FIG. 6 is a flowchart illustrating one example method 600 for protecting the battery cells 140 and the electronic device 110 from excess heat, for example, generated by a malfunctioning component of the electronic device 110 or the rechargeable battery pack 120. As illustrated in FIG. 6, the method 600 includes receiving a voltage across a current limiting switch (at block 610). The comparator 320 of the power limiting circuit 230 receives the voltage at the node 264 between the second current limiting switch 222 and the electronic device 110 at the non-inverting input IN+. The comparator 320 also receives the voltage at the node 262 between the negative terminal 144 of the battery cells 140 and the first current limiting switch 212 at the negative supply V−. That is, the comparator 320 measures the voltage (for example, a first voltage) across the first current limiting switch 212 (for example, a first switch voltage), the second sense resistor 270, and the second current limiting switch 222 (for example, a second switch voltage).

In some embodiments, the comparator 320 receives the voltage at the node 262 between the first sense resistor 260 and the first current limiting switch 212 at the negative supply V− of the comparator 320. By avoiding the voltage drop across the first sense resistor 260, the tolerance of the power limiting circuit 230 is reduced. In other embodiments, the comparator 320 receives voltage across only one of the first current limiting switch 212 or the second current limiting switch 222. In yet other embodiments, the battery protection circuit 150 includes only one current limiting circuit and only one current limiting switch. In these embodiments, the comparator 320 receives the voltage across the one current limiting switch.

The method 600 also includes receiving a reference voltage (at block 620). The comparator 320 receives the reference voltage at the inverting input IN− from the voltage regulator circuit 310. As described above, the reference voltage is provided to the comparator 320 after a drop across the resistor 342 in the voltage divider circuit 340. The resistance values for resistors 342 and 344 may be selected to provide the desired reference voltage to the comparator 320.

The method 600 further includes determining whether the voltage across the current limiting switch exceeds the reference voltage (at block 630). As noted above, a malfunctioning switch may have an increase in initial resistance which can lead to an increase in voltage across the switch and heat generated by the switch. The comparator 320 may include two output states, for example, a high state and a low state. The high and low states may be different voltage levels, such as, for example, 3.3V for a high state and 0V for a low state. The power limiting circuit 230 may be configured to open the first current limiting switch 212 and the second current limiting switch 222 when the output of the comparator 320 is in a high state. The comparator 320 turns the output high or low based on the comparison of the voltage across the current limiting switch and the reference voltage.

When the voltage across the current limiting switch exceeds the reference voltage, the power limiting circuit 230 (via the comparator 320) opens the first current limiting switch 212, the second current limiting switch 222, or both (at block 640). As described above, the output of the comparator 320 is provided to the first control input 412 of the first current limiting switch 212 and the second control input 512 of the second current limiting switch 222. When the output of the comparator 320 is high, that is, when the comparator 320 determines that the voltage across the current limiting switch exceeds the reference voltage, the first current limiting switch 212 and the second current limiting switch 222 are provided control signals to open.

In some alternate embodiments, the power limiting circuit 230 is configured to open the first current limiting switch 212 and the second current limiting switch 222 when the output of the comparator 320 is in a low state. In these embodiments, the comparator 320 outputs a low state when the voltage across the current limiting switch exceeds the reference voltage. Accordingly, when the output of the comparator 320 is low, that is, when the comparator 320 determines that the voltage across the current limiting switch exceeds the reference voltage, the first current limiting switch 212 and the second current limiting switch 222 are provided control signals to open.

Figure 7:
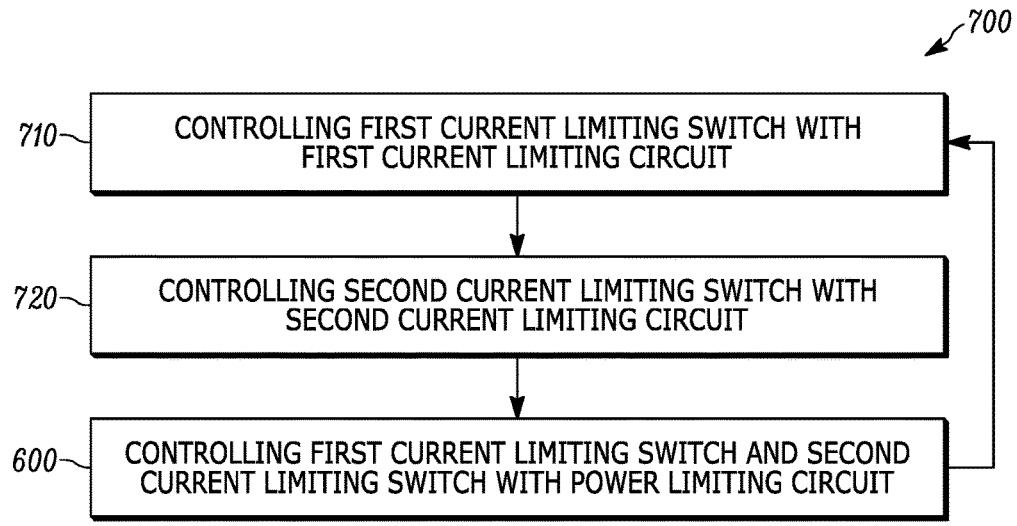
FIG. 7 is a flowchart of a method of limiting current in accordance with some embodiments.

FIG. 7 is a flowchart illustrating one example method 700 protecting the battery cells 140 and the electronic device 110. As illustrated in FIG. 7, the method 700 includes controlling the first current limiting switch 212 with the first current limiting control circuit 210 (at block 710). The first current limiting control circuit 210 receives the current flowing between the battery cells 140 and the electronic device 110 at the inverting input IN− of the first current comparator 420. The first current comparator 420 receives a reference current from the first voltage reference chip 410 at the non-inverting input IN+. When the first current comparator 420 determines that the current through the first current limiting switch 212 (that is, between the battery cells 140 and the electronic device 110) exceeds the reference current, the first current comparator 420 provides a control signal to open the first current limiting switch 212.

The method 700 includes controlling the second current limiting switch 222 with the second current limiting control circuit 220 (at block 720). The second current limiting control circuit 220 receives the current flowing between the battery cells 140 and the electronic device 110 at the inverting input IN− of the second current comparator 520. The second current comparator 520 receives a reference current from the second voltage reference chip 510 at the non-inverting input IN+. When the second current comparator 520 determines that the current through the second current limiting switch 222 (that is, between the battery cells 140 and the electronic device 110) exceeds the reference current, the second current comparator 520 provides a control signal to open the second current limiting switch 222.

The method 700 includes controlling the first current limiting switch 212 and the second current limiting switch 222 with the power limiting circuit 230 as described above with respect to method 600. The power limiting circuit 230, in contrast with the first current limiting control circuit 210 or the second current limiting control circuit 220, provides a control output to both the first current limiting switch 212 and the second current limiting switch 222. In one exemplary instance, when the first current limiting switch 212 fails, the voltage across the first current limiting switch 212 increases. However, the current between the battery cells 140 and the electronic device 110 may remain unchanged. In this exemplary instance, the power limiting circuit 230 detects that the voltage across the first current limiting switch 212 is above the reference voltage. The power limiting circuit 230 opens the second current limiting switch 222 (that is, the control switch) in response to the detection, thereby cutting off the current flow to the first current limiting switch 212. The power limiting circuit 230 may perform a similar operation when the second current limiting switch 222 fails.

One advantage of the above techniques is that a faulted switch is detected and prevented from generating excessive heat. The power limiting circuit 230 detects a faulted switch and opens the switch to prevent current flowing through the switch. Another advantage of the above techniques is that a faulted switch is detected at low voltages and with high precision.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A battery protection circuit within a battery pack, the battery protection circuit comprising:
    a current limiting switch provided on a current path of a battery and coupled to a current limiting control circuit to limit current output by the battery, the current limiting switch having a switch voltage contributing to a first voltage;
    a control switch;
    a power limiting circuit comparator having a reference voltage input to receive a reference voltage, a voltage input to receive the first voltage, and a control output coupled to the control switch, the power limiting circuit comparator configured to provide a control signal that opens the control switch when the first voltage exceeds the reference voltage to prevent the battery pack from generating excess heat, wherein the current limiting switch is a first current limiting switch, and wherein the control switch is a second current limiting switch provided on the current path of the battery and is coupled to a second current limiting control circuit to limit current output by the battery, the second current limiting switch having a second switch voltage contributing to the first voltage,
    a first driving switch having a first driver control input coupled to the control output of the power limiting circuit comparator and a first driving output coupled to a first control input of the current limiting switch; and
    a second driving switch having a second driver control input coupled to the control output of the power limiting circuit comparator and a second driving output coupled to a second control input of the second current limiting switch.

2. The battery protection circuit of claim 1, wherein the first current limiting switch and the second current limiting switch are coupled in series with a resistive element, the first voltage being measured across the first current limiting switch, the second current limiting switch, and the resistive element.

3. The battery protection circuit of claim 1, wherein the power limiting circuit comparator is configured to provide the control signal to the current limiting switch to open the current limiting switch when the first voltage exceeds the reference voltage.

4. The battery protection circuit of claim 1, further comprising:
    a voltage regulator circuit having a voltage output coupled to the reference voltage input and providing the reference voltage to the power limiting circuit comparator.

5. The battery protection circuit of claim 4, wherein the voltage regulator circuit comprises:
    a voltage regulator having an operating voltage output that provides an operating voltage to the power limiting circuit comparator; and
    a voltage divider circuit including
        a voltage divider input coupled to the operating voltage output to receive the operating voltage, and
        a voltage divider output coupled to the reference voltage input and providing the reference voltage to the power limiting circuit comparator.

6. A method for protecting a battery of a battery pack comprising:
    receiving, with a power limiting circuit comparator, a first voltage, the first voltage including a switch voltage across a current limiting switch provided on a current path of a battery and coupled to a current limiting control circuit to limit current output by the battery;
    receiving, with the power limiting circuit comparator, a reference voltage;
    comparing, with the power limiting circuit comparator, the first voltage and the reference voltage; and
    controlling, with the power limiting circuit comparator, a control switch to open when the first voltage exceeds the reference voltage to prevent the battery pack from generating excess heat, wherein the current limiting switch is a first current limiting switch, and wherein the control switch is a second current limiting switch provided on the current path of the battery and is coupled to a second current limiting control circuit to limit current output by the battery, the second current limiting switch having a second switch voltage contributing to the first voltage,
    providing a first driving switch having a first driver control input coupled to a control output of the power limiting circuit comparator and a first driving output coupled to a first control input of the current limiting switch; and
    providing a second driving switch having a second driver control input coupled to the control output of the power limiting circuit comparator and a second driving output coupled to a second control input of the second current limiting switch.

7. The method of claim 6, wherein the first current limiting switch and the second current limiting switch are coupled in series with a resistive element, the first voltage being measured across the first current limiting switch, the second current limiting switch, and the resistive element.

8. The method of claim 6, further comprising providing, with the power limiting circuit comparator, a control signal to the current limiting switch to open the current limiting switch when the first voltage exceeds the reference voltage.

9. The method of claim 6, wherein the reference voltage is received from a voltage regulator circuit having a voltage output coupled to a reference voltage input of the power limiting circuit comparator.

10. The method of claim 9, further comprising:
providing, with a voltage regulator, an operating voltage to the power limiting circuit comparator;
providing, with the voltage regulator, an operating voltage to a voltage divider circuit,
providing, with the voltage divider circuit, the reference voltage to the power limiting circuit comparator.

11. The method of claim 6, further comprising:
controlling, with a first current limiting control circuit, the first current limiting switch; and
controlling, with a second current limiting control circuit, the second current limiting switch.

12. A battery protection circuit within a battery pack, the battery protection circuit comprising:
a current limiting switch provided on a current path of a battery and coupled to a current limiting control circuit to limit current output by the battery, the current limiting switch having a switch voltage contributing to a first voltage;
a control switch;
a power limiting circuit comparator having a reference voltage input to receive a reference voltage, a voltage input to receive the first voltage, and a control output coupled to the control switch, the power limiting circuit comparator configured to provide a control signal that opens the control switch when the first voltage exceeds the reference voltage to prevent the battery pack from generating excess heat,
a voltage regulator circuit having a voltage output coupled to the reference voltage input and providing the reference voltage to the power limiting circuit comparator, wherein the voltage regulator circuit includes
a voltage regulator having an operating voltage output that provides an operating voltage to the power limiting circuit comparator; and
a voltage divider circuit including
a voltage divider input coupled to the operating voltage output to receive the operating voltage, and
a voltage divider output coupled to the reference voltage input and providing the reference voltage to the power limiting circuit comparator.

13. The battery protection circuit of claim 12, wherein the current limiting switch is a first current limiting switch, and wherein the control switch is a second current limiting switch provided on the current path of the battery and is coupled to a second current limiting control circuit to limit current output by the battery, the second current limiting switch having a second switch voltage contributing to the first voltage.

14. The battery protection circuit of claim 13, wherein the first current limiting switch and the second current limiting switch are coupled in series with a resistive element, the first voltage being measured across the first current limiting switch, the second current limiting switch, and the resistive element.

15. The battery protection circuit of claim 13, wherein the power limiting circuit comparator is configured to provide the control signal to the current limiting switch to open the current limiting switch when the first voltage exceeds the reference voltage.

16. A method for protecting a battery of a battery pack comprising:
receiving, with a power limiting circuit comparator, a first voltage, the first voltage including a switch voltage across a current limiting switch provided on a current path of a battery and coupled to a current limiting control circuit to limit current output by the battery;
receiving, with the power limiting circuit comparator, a reference voltage, wherein the reference voltage is received from a voltage regulator circuit having a voltage output coupled to a reference voltage input of the power limiting circuit comparator;
comparing, with the power limiting circuit comparator, the first voltage and the reference voltage;
controlling, with the power limiting circuit comparator, a control switch to open when the first voltage exceeds the reference voltage to prevent the battery pack from generating excess heat;
providing, with a voltage regulator of the voltage regulator circuit, an operating voltage to the power limiting circuit comparator;
providing, with the voltage regulator, an operating voltage to a voltage divider circuit,
providing, with the voltage divider circuit, the reference voltage to the power limiting circuit comparator.

17. The method of claim 16, wherein the current limiting switch is a first current limiting switch, and wherein the control switch is a second current limiting switch provided on the current path of the battery and is coupled to a second current limiting control circuit to limit current output by the battery, the second current limiting switch having a second switch voltage contributing to the first voltage.

18. The method of claim 17, wherein the first current limiting switch and the second current limiting switch are coupled in series with a resistive element, the first voltage being measured across the first current limiting switch, the second current limiting switch, and the resistive element.

19. The method of claim 17, further comprising providing, with the power limiting circuit comparator, a control signal to the current limiting switch to open the current limiting switch when the first voltage exceeds the reference voltage.

20. The method of claim 17, further comprising:
controlling, with a first current limiting control circuit, the first current limiting switch; and
controlling, with a second current limiting control circuit, the second current limiting switch.

\* \* \* \* \*